US009883211B2

(12) United States Patent
Kumar

(10) Patent No.: US 9,883,211 B2
(45) Date of Patent: Jan. 30, 2018

(54) METHOD AND APPARATUS FOR SELECTION OF ADVERTISEMENTS TO FILL A COMMERCIAL BREAK OF AN UNKNOWN DURATION

(71) Applicant: Cisco Technology Inc., San Jose, CA (US)

(72) Inventor: Hemant Kumar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 640 days.

(21) Appl. No.: 14/014,005

(22) Filed: Aug. 29, 2013

(65) Prior Publication Data

US 2014/0068662 A1 Mar. 6, 2014

(30) Foreign Application Priority Data

Sep. 3, 2012 (IN) .......................... 3636/CHE/2012

(51) Int. Cl.
| | | |
|---|---|---|
| *H04N 21/234* | (2011.01) | |
| *H04N 21/262* | (2011.01) | |
| *H04N 21/81* | (2011.01) | |
| *H04N 21/458* | (2011.01) | |
| *H04H 60/37* | (2008.01) | |
| *G06Q 30/02* | (2012.01) | |

(52) U.S. Cl.
CPC ... *H04N 21/23424* (2013.01); *G06Q 30/0241* (2013.01); *G06Q 30/0251* (2013.01); *H04N 21/26233* (2013.01); *H04N 21/26241* (2013.01); *H04N 21/458* (2013.01); *H04N 21/812* (2013.01); *H04H 60/37* (2013.01)

(58) Field of Classification Search
None
See application file for complete search history.

(56) References Cited

U.S. PATENT DOCUMENTS

| | | | |
|---|---|---|---|
| 5,574,845 A * | 11/1996 | Benson | G06F 17/30852 345/418 |
| 5,606,154 A | 2/1997 | Doigan et al. | |
| 6,411,992 B1 * | 6/2002 | Srinivasan | G06Q 30/02 348/E7.063 |
| 7,849,476 B2 * | 12/2010 | Stevens | H04N 7/163 348/559 |

(Continued)

FOREIGN PATENT DOCUMENTS

WO WO 2005/122688 A2 12/2005

OTHER PUBLICATIONS

Jul. 23, 2013 Office Communication in connection with prosecution of GB 1301411.3.

(Continued)

*Primary Examiner* — Usha Raman
(74) *Attorney, Agent, or Firm* — Samuel M. Katz

(57) ABSTRACT

In one embodiment, a method includes: receiving a user input requesting an event to be displayed; playing out the requested event; identifying a type of the requested event; estimating a duration of a next commercial break occurring in the requested event according to the type; selecting at least one advertisement having a duration corresponding to the estimated duration of the next commercial break; and playing out the at least one advertisement. Related systems, apparatus and methods are also described.

28 Claims, 7 Drawing Sheets

(56) References Cited

U.S. PATENT DOCUMENTS

| | | | |
|---|---|---|---|
| 7,996,422 B2 | 8/2011 | Shahraray et al. | |
| 8,179,080 B2* | 5/2012 | Vannier | H02K 33/10 318/626 |
| 8,335,708 B1* | 12/2012 | Barzilay et al. | 705/7.29 |
| 8,782,261 B1* | 7/2014 | Rodriguez | H04H 60/65 709/217 |
| 8,949,882 B2* | 2/2015 | Sherwin | G11B 27/031 725/32 |
| 9,009,066 B2* | 4/2015 | Long | G06Q 30/02 705/14.68 |
| 9,319,754 B2* | 4/2016 | Mehta | H04N 21/812 |
| 9,491,397 B2* | 11/2016 | Basra | H04N 5/76 |
| 9,674,584 B2* | 6/2017 | Briggs | H04N 21/812 |
| 9,723,371 B2* | 8/2017 | Stephens | H04N 5/445 |
| 2002/0069408 A1* | 6/2002 | Abe et al. | 725/36 |
| 2002/0083444 A1* | 6/2002 | Blasko | G06Q 30/02 725/35 |
| 2003/0101449 A1* | 5/2003 | Bentolila et al. | 725/10 |
| 2004/0031058 A1* | 2/2004 | Reisman | G06F 17/30873 725/112 |
| 2004/0181802 A1* | 9/2004 | Bollapragada et al. | 725/36 |
| 2004/0186737 A1* | 9/2004 | Roberts | G06Q 30/02 705/1.1 |
| 2004/0189873 A1* | 9/2004 | Konig et al. | 348/607 |
| 2004/0194131 A1* | 9/2004 | Ellis | H04N 5/44543 725/34 |
| 2004/0210621 A1* | 10/2004 | Antonellis | G06Q 10/087 709/200 |
| 2005/0149968 A1* | 7/2005 | Konig | G06F 17/30802 725/32 |
| 2006/0064721 A1 | 3/2006 | Del Val et al. | |
| 2006/0195860 A1* | 8/2006 | Eldering | G06F 17/30802 725/19 |
| 2006/0271947 A1* | 11/2006 | Lienhart | G06F 17/30787 725/19 |
| 2006/0287912 A1* | 12/2006 | Raghuvamshi | G06Q 30/02 705/14.4 |
| 2006/0287915 A1* | 12/2006 | Boulet | G06Q 30/02 705/14.61 |
| 2008/0040666 A1* | 2/2008 | Wang | G06Q 30/02 715/210 |
| 2008/0285943 A1 | 11/2008 | Wang et al. | |
| 2008/0307454 A1* | 12/2008 | Ahanger et al. | 725/36 |
| 2009/0312031 A1* | 12/2009 | Harris | H04L 41/147 455/453 |
| 2010/0008644 A1 | 1/2010 | Kim | |
| 2010/0023964 A1 | 1/2010 | Basso et al. | |
| 2010/0031285 A1* | 2/2010 | Haberman | H04H 20/103 725/34 |
| 2010/0188578 A1* | 7/2010 | Liang | H04N 5/44513 348/563 |
| 2010/0205049 A1 | 8/2010 | Long et al. | |
| 2010/0303441 A1 | 12/2010 | Arques et al. | |
| 2011/0261259 A1* | 10/2011 | Phillips | H04N 5/44591 348/565 |
| 2011/0288907 A1* | 11/2011 | Harvey | G06Q 10/0639 705/7.29 |
| 2012/0011545 A1* | 1/2012 | Doets et al. | 725/38 |
| 2012/0192222 A1 | 7/2012 | Kumar et al. | |
| 2012/0198031 A1* | 8/2012 | Bouazizi | H04L 65/4084 709/219 |
| 2013/0179913 A1* | 7/2013 | Haberman | H04N 21/24 725/14 |
| 2013/0198328 A1* | 8/2013 | Green et al. | 709/217 |
| 2013/0198772 A1* | 8/2013 | Wang | H04H 20/18 725/32 |
| 2013/0222597 A1* | 8/2013 | Brink | G06Q 30/0211 348/157 |
| 2013/0246567 A1* | 9/2013 | Green et al. | 709/217 |
| 2013/0247080 A1* | 9/2013 | Vinson et al. | 725/14 |
| 2014/0129331 A1* | 5/2014 | Spivack | G06Q 30/0269 705/14.53 |
| 2014/0157308 A1* | 6/2014 | Ahern et al. | 725/35 |
| 2014/0195358 A1* | 7/2014 | Beining | H04N 21/812 705/14.73 |
| 2014/0259044 A1* | 9/2014 | Kirby | G06Q 30/0207 725/23 |
| 2014/0279051 A1* | 9/2014 | Curtis | G06Q 30/0273 705/14.69 |
| 2014/0316899 A1* | 10/2014 | McGowan | G06Q 30/0264 705/14.61 |
| 2014/0337346 A1* | 11/2014 | Barthel et al. | 707/738 |
| 2015/0074732 A1* | 3/2015 | Green et al. | 725/93 |
| 2015/0106841 A1* | 4/2015 | Wolf | H04N 21/812 725/32 |
| 2015/0189351 A1* | 7/2015 | Kitts | G06Q 30/0242 725/19 |
| 2015/0237386 A1* | 8/2015 | Sheehan | H04N 21/2668 725/34 |
| 2015/0288571 A1* | 10/2015 | Baughman | H04L 41/145 703/21 |
| 2015/0297949 A1* | 10/2015 | Aman | G06T 7/246 348/157 |
| 2015/0302347 A1* | 10/2015 | Fredette | G06Q 50/12 705/15 |
| 2015/0350692 A1* | 12/2015 | Narasimhan | H04H 20/38 725/81 |
| 2016/0110877 A1* | 4/2016 | Schwartz | G06T 7/20 382/107 |
| 2016/0310850 A1* | 10/2016 | Covington | A63F 13/828 |
| 2016/0315983 A1* | 10/2016 | Lewis | G11B 27/02 |
| 2017/0140398 A1* | 5/2017 | Fleischman | G06Q 30/0201 |
| 2017/0147925 A1* | 5/2017 | Bostick | G06N 5/022 |
| 2017/0201779 A1* | 7/2017 | Publicover | H04N 21/252 |
| 2017/0208369 A1* | 7/2017 | Major | H04N 21/442 |

OTHER PUBLICATIONS

Aug. 26, 2013 Office Communication in connection with prosecution of IN 3636/CHE/2012.

* cited by examiner

METHOD AND APPARATUS FOR SELECTION OF ADVERTISEMENTS TO FILL A COMMERCIAL BREAK OF AN UNKNOWN DURATION

FIELD OF THE INVENTION

The present invention relates to methods and apparatus for selection of advertisements to fill a commercial break of an unknown duration.

BACKGROUND OF THE INVENTION

Audio video content is typically broadcast with breaks filled by additional media contents e.g. advertisements. Third parties, such as advertisers, can purchase airtime corresponding to these breaks to air media contents e.g. television advertisements.

Broadcasters and/or television platform operators typically control and decide in advance when and where to place these breaks in the audio video content. Therefore, media contents can be inserted in the breaks in an optimal manner. Well-known techniques such as advertisement substitution/insertion may also be applied for replacing initial advertisements by targeted and/or customized advertisements more relevant to the final user.

However, for certain type of television broadcast audio video contents, such as sports events, live coverage of an award ceremony, or even in advertisement substitution/insertion scenarios, the start time, duration and placement of these breaks may vary from one break to another and may not be known in advance. Therefore, it becomes more complicated to predict the occurrence and duration of those breaks and to optimally select and fill them with advertisements.

U.S. Published Patent Application 2010/0023964 of AT&T Labs describes systems, methods, and computer readable-media for temporally adaptive media playback. The method for adaptive media playback includes estimating or determining an amount of time between a first event and a second event, selecting media content to fill the estimated amount of time between the first event and the second event, and playing the selected media content possibly at a reasonably different speed to fit the time interval. One embodiment includes events that are destination-based or temporal-based. Another embodiment includes adding, removing, speeding up, or slowing down selected media content in order to fit the estimated amount of time between the first event and the second event or to modify the selected media content to adjust to an updated estimated amount of time. Another embodiment bases selected media content on a user or group profile.

U.S. Pat. No. 7,996,422 of AT&T Intellectual Property L.L.P., describes systems, methods, and computer readable-media for adaptive media playback based on destination. The method for adaptive media playback comprises determining one or more destinations, collecting media content that is relevant to or describes the one or more destinations, assembling the media content into a program, and outputting the program. In various embodiments, media content may be advertising, consumer-generated, based on real-time events, based on a schedule, or assembled to fit within an estimated available time. Media content may be assembled using an adaptation engine that selects a plurality of media segments that fit in the estimated available time, orders the plurality of media segments, alters at least one of the plurality of media segments to fit the estimated available time, if necessary, and creates a playlist of selected media content containing the plurality of media segments.

SUMMARY OF THE INVENTION

There is thus provided in accordance with an embodiment of the present invention a method for playing out at least one advertisement at a client device during a commercial break, the method including: receiving a user input requesting an event to be displayed; displaying the requested event; identifying a type of the requested event; estimating a duration of a next commercial break occurring in the requested event according to the type; selecting at least one advertisement having a duration corresponding to the estimated duration of the next commercial break; and playing out the at least one advertisement.

Further, in accordance with an embodiment of the present invention, the identifying a type of the requested event includes using one or more of: genre information; subgenre information; and metadata information of the requested event to identify the type of the requested event.

Still further, in accordance with an embodiment of the present invention, the estimating further includes: retrieving a set of parameters for each past event of a plurality of past events; categorizing past events according to the set of parameters, wherein past events having similar sets of parameters are grouped into a same category; generating, for each category, a plurality of estimates that specifically characterize commercial break durations of the past events grouped into a same category; identifying a category relevant to the identified type of the requested event; and selecting an estimate from the plurality of estimates related to the identified relevant category.

Additionally, in accordance with an embodiment of the present invention, the retrieving a set of parameters includes: retrieving commercial break durations for each of the past events; retrieving a total duration for each of the past events; and retrieving an importance of an audio video content item for each of the past events.

Further, in accordance with an embodiment of the present invention, the categorizing includes grouping past events having same sets of parameters into a same category.

Still further, in accordance with an embodiment of the present invention, the identifying a category includes using one or more of: genre information; subgenre information; and metadata information of each of the past events grouped in a same category to identify the type of the category.

Additionally, in accordance with an embodiment of the present invention, the generating includes generating, for each category, an estimate that best models commercial break durations of the past events grouped into the same category.

Further, in accordance with an embodiment of the present invention, the generating includes using the sets of parameters of the past events grouped into a same category to generate the plurality of estimates.

Still further, in accordance with an embodiment of the present invention, the identifying a category includes comparing the type of the requested event to the types of the categories to identify a category relevant to the requested event.

Additionally, in accordance with an embodiment of the present invention, the method further includes estimating a duration of a next commercial break using the selected estimate.

Further, in accordance with an embodiment of the present invention, the estimating further includes reducing the selected estimate by a configurable guard time.

Still further, in accordance with an embodiment of the present invention, the selecting at least one advertisement includes: determining durations of a plurality of advertisements available to be played out; generating a plurality of advertisement lists using the determined durations of the available advertisements, wherein each of the advertisement lists includes at least one advertisement; and wherein each of the advertisement lists has a duration corresponding to the estimated duration of the next commercial break; and selecting an advertisement list to played out.

Additionally, in accordance with an embodiment of the present invention, the determining further includes: grouping advertisements having a similar determined duration into a same group, thereby forming a plurality of advertisement duration lists; and sorting each advertisement duration list of the plurality of advertisement duration lists.

Further, in accordance to an embodiment of the present invention, the grouping advertisements includes grouping advertisements having a same determined duration into a same group, thereby forming a plurality of advertisement duration lists.

Still further, in accordance to an embodiment of the present invention, the sorting includes placing advertisements generating most revenue to a service provider and/or a platform operator at the beginning of an advertisement duration list.

Additionally, in accordance with an embodiment of the present invention, the sorting includes placing advertisements most relevant to the requested event at the beginning of an advertisement duration list.

Further, in accordance to an embodiment of the present invention, the sorting includes placing advertisements most relevant to user preferences at the beginning of an advertisement duration list.

Still further, in accordance to an embodiment of the present invention, the selecting includes selecting an advertisement duration list having a duration that is less than the estimated duration for the next commercial break.

Additionally, in accordance with an embodiment of the present invention, the selecting includes selecting an advertisement duration list having a duration that is more than the estimated duration for the next commercial break.

Further, in accordance to an embodiment of the present invention, the method further includes: receiving an expiration time of the commercial break; determining an end time for the estimated duration of the commercial break; and resuming the requested event at the expiration time when the expiration time corresponds to the end time.

Still further, in accordance to an embodiment of the present invention, the method further includes: receiving an expiration time of the commercial break; determining an end time for the estimated duration of the commercial break; and resuming the requested event at the determined end time when the expiration time is earlier than the determined end time.

Additionally, in accordance with an embodiment of the present invention, the resuming the requested event at the determined end time further includes: allowing an advertisement being played out after the expiration time to be played out in its entirety; storing a portion of the requested event in a storage device, wherein the storing starts at the expiration time; determining if the stored portion is important; and resuming the requested event at the determined end time by playing out the requested event if it is determined that the stored portion is not important; or by playing back the stored portion of the requested event if it is determined that the stored portion is important.

Further, in accordance to an embodiment of the present invention, the resuming the requested event at the determined end time by playing back the stored portion includes playing back the stored portion of the requested event at a faster than real time speed.

Still further, in accordance to an embodiment of the present invention, the method further includes: reducing an estimated duration of a further commercial break by an amount of time between the expiration time and the determined end time.

Additionally, in accordance with an embodiment of the present invention, the resuming is made at the received expiration time when the expiration time is later than the determined end time.

Further, in accordance to an embodiment of the present invention, the method further includes: estimating a remaining duration of the commercial break occurring in the requested event according to the type; selecting at least one further advertisement having a duration corresponding to the estimated remaining duration of the commercial break; and playing out the at least one further advertisement.

Still further, in accordance to an embodiment of the present invention, the estimating a remaining duration includes selecting one further estimate from the plurality of estimates.

Additionally, in accordance with an embodiment of the present invention, the selecting at least one further advertisement includes selecting one further advertisement list to be played out.

There is also provided with a further embodiment of the present invention a client device, the client device including: a receiver operable to receive a user input requesting an event to be displayed; a decoder operable to play out the requested event; and an advertisement system operable to: identify a type of the requested event; estimate a duration of a next commercial break occurring in the requested event according to the type; and select at least one advertisement having a duration corresponding to the estimated duration of the next commercial break; and wherein the decoder is further operable to play out the at least one advertisement.

There is also provided with a further embodiment of the present invention a client device, the client device including: means for receiving a user input requesting an event to be displayed; means for playing out the requested event; means for identifying a type of the requested event; means for estimating a duration of a next commercial break occurring in the requested event according to the type; means for selecting at least one advertisement having a duration corresponding to the estimated duration of the next commercial break; and wherein the means for playing out is further for playing out the at least one advertisement.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

In the following description, numerous specific details are set forth in order to provide a thorough understanding of the various principles of the present invention. However, those skilled in the art will appreciate that not all these details are necessarily always required for practicing the present invention. In this instance, well-known circuits, control logic, and the details of computer program instructions for conventional algorithms and processes have not been shown in detail in order not to obscure the general concepts unnecessarily.

Aspects of the present invention may be embodied in software programming code, which is typically maintained in a permanent storage, such as a computer readable medium. In a client-server environment, such software programming code may be stored on a client or a server. The software programming code may also be embodied on any of a variety of known tangible media for use with a data processing system, such as a diskette, hard drive, or CD-ROM. The code may be distributed on such media, or may be distributed to consumers from the memory or storage of one computer system over a network of some type to storage devices on other computer systems for use by consumers of such other systems.

Although the principles of the present invention are largely described herein in relation to a television broadcast environment and advertising applications, this is an example selected for convenience of presentation, and is not limiting.

Definitions and Terminology

The term "content distribution" in this disclosure, unless otherwise specified, is intended to encompass communication of information by various techniques, including but not limited to printed publications, various audiovisual media, television, radio, communication via networks such as the Internet and any other traditional form of communication. The content may be displayed to the consumer via a diverse set of devices and modalities. Some examples include a Set-Top-Box (STB), a computer monitor using a browser or any appropriate software application, a Digital Video Recorder (DVR), or an MP3 player, as well as traditional broadcast radio and television sets.

System Architecture

Figure 1:
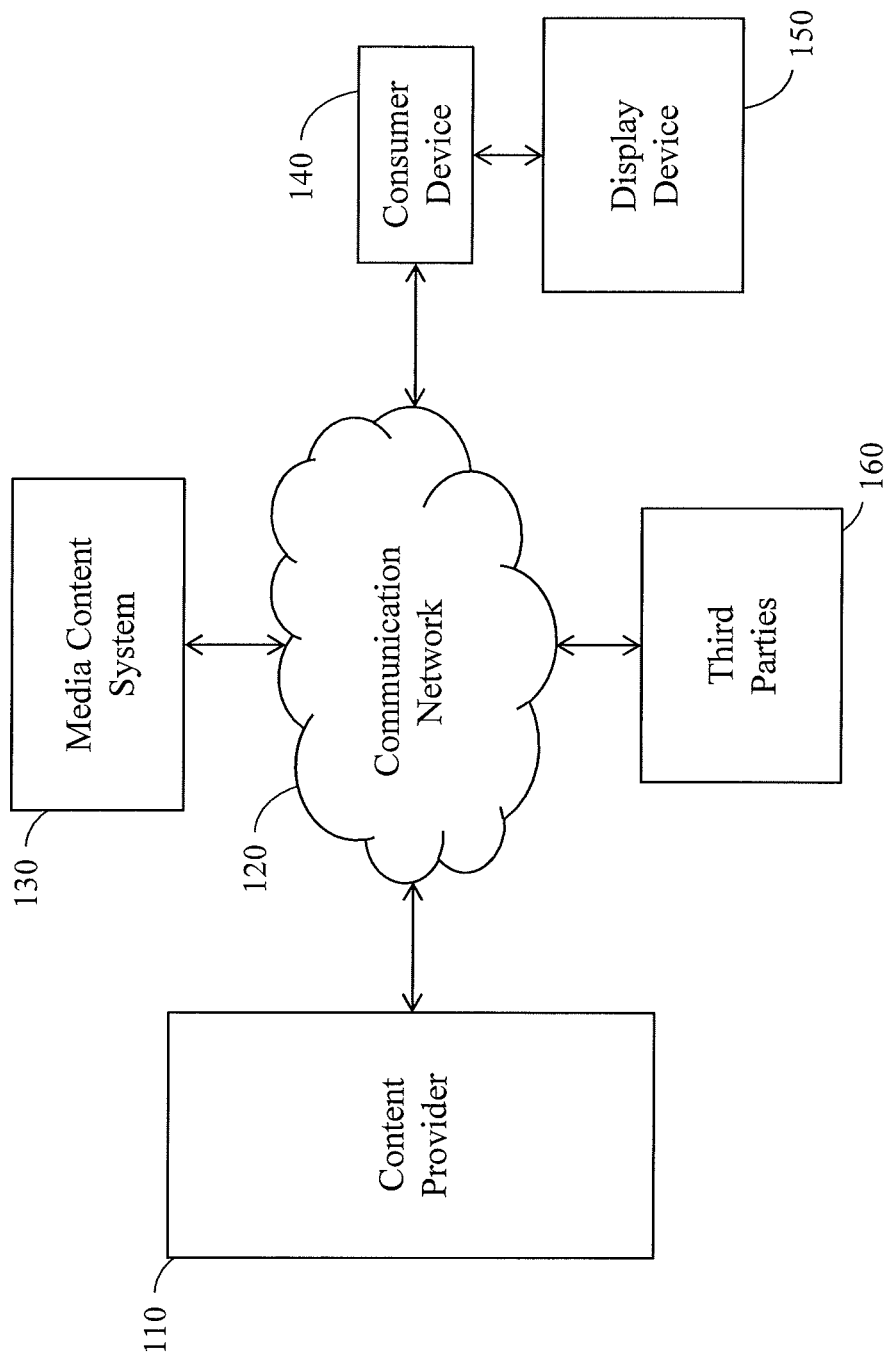
FIG. 1 is a schematic pictorial diagram of a system that is suitable for carrying out embodiments of the present invention.

Reference is now made to FIG. 1, which is a schematic pictorial diagram of a system that is suitable for carrying out embodiments of the present invention.

FIG. 1 shows a content distribution system that typically includes a content provider 110, a communication network 120, a media content system 130 and a consumer device 140 linked to a display device 150. The media content system 130 automatically facilitates the selection and insertion of media content into content transmitted by the content provider 110. The media content system 130 typically comprises a general purpose or embedded computer processor, which is programmed with suitable programs for carrying the functions described later in the present specification. Thus, although portions of the media content system 130 are shown in subsequent figures as comprising a number of separate functional blocks, these blocks are not necessarily separate physical entities, but rather represent different computing tasks or data objects stored in a memory that is accessible to the programs. These tasks may be carried out in a software running on a single processor, or on multiple processors. The programs may be embodied on any of a variety of known tangible storage media for use with a computer system, such as a diskette, hard drive, or CD-ROM. Alternatively or additionally, the media content system 130 may comprise a digital signal processor or hard wired logic. Typically, the media content system 130 comprises data storage for a database that may be any type of storage, including a distributed database.

The media content system 130 is linked by a communication network 120, which may be the Internet, to any number of content providers 110, shown representatively as a single content provider 110 in FIG. 1 for sake of simplicity. The content provider 110 issues content via a server. Additionally or alternatively, the content provider 110 may transmit content, using any transmission facility, to consumers' devices 140. Consumers are able to receive the content from the content provider 110 via the network 120 and rendering it on a display device 150.

Third party entities 160 desirous of inserting media contents into delivered content are sometimes referred to herein for convenience as "advertisers". FIG. 1 shows third party entities 160 which communicate with the content provider 110 for inserting media contents into the delivered content. When the media contents are commercial advertisements, fees paid to the content provider 110 can subvent at least a portion of the costs of the content distribution operation. Those skilled in the art will appreciate that the third party entities 160 are not limited to commercial advertisers, but include any entities desirous of publishing many kinds of media contents for any purpose. They may be connected to the content provider 110 via the network 120 to facilitate the arrangement.

The media content system 130 is shown in FIG. 1 as a separate entity, which is not necessarily the case. The media content system may be operated by an independent service provider. Alternatively, it may be controlled or operated by any of all of the content provider 110 and the third party entities 160. In another embodiment of the present invention, the content provider 110 may also distribute content on physical media to the consumers and communicate with the media content system 130 and the third party entities 160 by many alternative communication modalities. Furthermore, in some embodiments of the present invention, the media content system 130 may be co-located or integral with the content provider installation 110 or with the consumer's equipment 140. For example, the functions of the media content system 130 may be fully or partially incorporated in a headend or in a STB.

Figure 2:
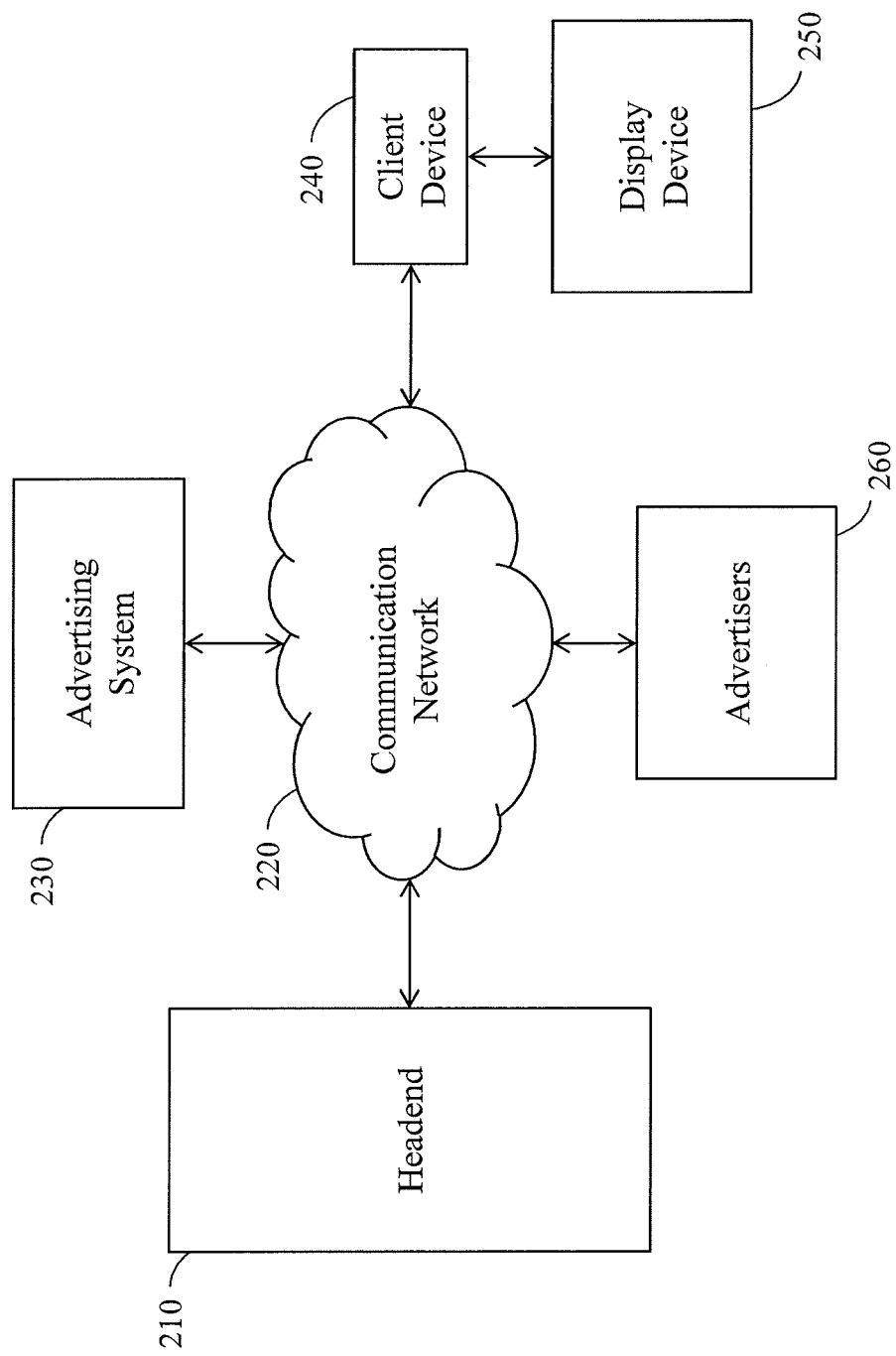
FIG. 2 is a simplified pictorial illustration of a system constructed and operative in accordance with an embodiment of the present invention.

Reference is now made to FIG. 2, which is a simplified pictorial illustration of a system constructed and operative in accordance with an embodiment of the present invention.

FIG. 2 shows an audio video content distribution system in a television broadcast environment. A headend 210 typically communicates with a plurality of client devices 240 via a communications network 220. Additionally or alternatively, a plurality of headends 210 communicate with a single client device 240 or with a plurality of client devices 240 via the communications network 220. For simplicity of depiction and description, and without limiting the generality of the invention, only one client device 240 and one headend 210 are illustrated in FIG. 2.

The communication network 220 is a one-way or two-way communication network that includes at least one of the following: a satellite based communication network; a cable based communication network; a conventional terrestrial broadcast television network; a telephony based communication network; a telephony based television broadcast network; a mobile-telephony based television broadcast network; an Internet Protocol (IP) television broadcast network; and a computer based communication network. It is appreciated that in alternative embodiments, the communication network may, for example, be implemented by a one-way or two-way hybrid communication network, such as a combination cable-telephone network, a combination satellite-telephone network, a combination satellite-computer based communication network, or by any other appropriate network. Other ways of implementing the communication network 220 will be apparent to someone skilled in the art.

The system of FIG. 2 comprises a client device 240 disposed between a headend 210 and a display device 250. Client device 240 comprises a digital video recorder (DVR) that typically includes a high capacity storage device (not shown), such as a hard disk or high capacity memory. Client device 240 is coupled to a display device. Client device 240 typically comprises a tuner, a demultiplexer, a decoder, a receiver and a descrambler (not shown). It is appreciated that the client device 240 comprises standard hardware components and software components, as is well known in the art.

Client device 240 is typically connected in operation to display device 250 via a digital AV interface (e.g. HDMI, DVI, etc.) or via an analogue AV interface (e.g. component (RGB, YPbPr), composite (NTSC, PAL, SECAM), S-video, SCART, RF coaxial, D-Terminal (D-tanshi) etc.). While shown as separate entities in FIG. 2, the client device 240 may be integral with the display device 250 in other embodiments of the present invention.

Client device 240 typically receives, demultiplexes, decodes and decrypts/descrambles (as necessary) a broadcast television stream received from a headend 210 optionally under control of a conditional access device such as removable security element as is well known in the art. The removable security element typically includes a smart cart as is well known in the art. Decoder of the client device 240 typically plays out a decoded and decrypted/descrambled (as necessary) audio video (AV) content along with advertisements for display on the display device 250.

Display device 250 is typically operated by a user, for example via a remote control (RC) (not shown). Using the RC, a user can select an AV content item to view. The operating system software within client device 240 monitors user interaction and maintains a database of service and event information. The information available for events is typically specific to a particular broadcaster, but typically includes details such as event title; event start time; event duration; service; parental rating; and event genre. The database is typically constructed from information supplied by the broadcaster and typically broadcast alongside the regular AV content (e.g. Service Information (SI), as described in "ETSI 5 EN 300 468; Digital Video Broadcasting (DVB); Specification for Service Information (SI) in DVB systems").

The operating system software enables the user to choose an event/service to view. Since the software maintains the service and event database, it has detailed knowledge of attributes of the event (including genre, start time, duration etc.) and the service currently being viewed.

Furthermore, an advertising system 230 is provided that facilitates the selection and insertion of advertisements into commercial breaks during an event currently being displayed on the user's display device 250. Although shown as a separate entity in FIG. 2, the advertising system 230 may, in some embodiments of the present invention, be co-located or integral with the headend 210 or with the client device 240. The advertising system 230 operation will be described in greater details with reference to FIGS. 3 to 6.

Operation

Figure 3:
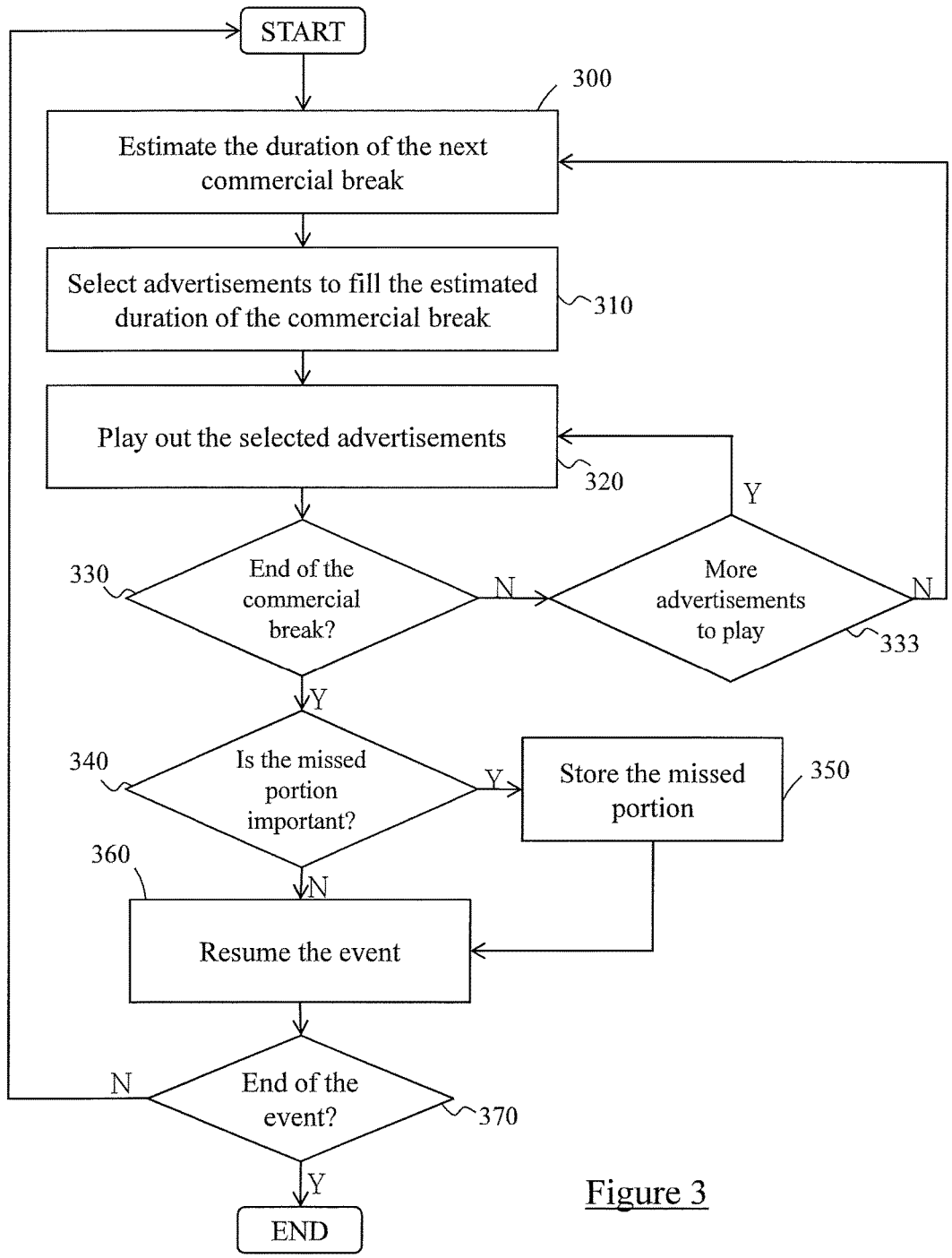
FIG. 3 is a flow chart of a method of estimating the duration of a commercial break and of selecting advertisements to fill said commercial break in accordance with an embodiment of the present invention.

Reference is now made to FIG. 3, which is a flow chart of a method of estimating the duration of a commercial break and of selecting advertisements to fill said commercial break in accordance with an embodiment of the present invention.

Once the user chose a service or an event, the AV content of said service is played out by the client device 240 for display on the display device 250. The AV content typically comprises advertising or commercial breaks under the control of the service provider and/or platform operator. These breaks usually have a predefined duration and are scheduled at known intervals. However, when the user is watching a live broadcast event (e.g. a football match, a cricket match, a live coverage of an award ceremony or other event etc.), the duration of the next commercial break may not be known in advance. In such a case, the time at which the commercial break starts may also not be known in advance. For example, in a cricket match, the playing time is divided into innings and overs. At the end of each over, the game is 'interrupted' thereby allowing the service provider and/or the platform operator to play advertisements but it is often difficult to estimate the duration of an over and the duration of the 'interruption'. Therefore, in such an example, the start time and the duration of the commercial break are not known in advance. It may also be the case when certain actions or occurrences in an event trigger special actions. For instance, a goal scored during a football game may trigger the display of advertisements for a short duration.

FIG. 3 describes a method, implemented by the advertising system 230 of FIG. 2, for estimating the duration of the next commercial break in the event currently being viewed and for selecting advertisements to fill said commercial break in an optimal manner.

At step 300, the advertising system 230 identifies an attribute defining the event currently being viewed by the user and estimates the duration of the next commercial break. This estimation is performed using various criteria such as, but not limited to, similar past events as provided by the service provider and/or the platform operator, past history of actual and expected commercial break durations etc. A method for estimating the duration of the next commercial break according to an embodiment of the present invention will be described in detail later in relation to FIG. 4.

Once the duration of the next commercial break is estimated, the advertising system 230 will use this value to select at least one advertisement to be played during said commercial break (step 310). Typically, a plurality of advertisements are played until termination of said estimated duration for the commercial break. In some cases, it is possible that a single advertisement is played during the estimated duration of the commercial break. In an embodiment of the present invention, the advertising system 230 is also able to select, at step 310, an optimal combination or sequence of advertisements that best fits the estimated duration of the commercial break. A method for selecting advertisements according to an embodiment of the present invention will be described in detail later in relation to FIG. 6.

At step 320, the selected advertisement(s) are played out by the decoder of client device 240 and displayed on the display device 250 for the estimated duration of the commercial break.

Then, the advertising system 230 receives an input related to the expiration time of the commercial break. This input may be notifying the advertising system 230 that the commercial break is about to elapse or has already elapsed. It will be appreciated by those skilled in the art that this input may be sent in any appropriate form such as an input signal sent by the service provider or the platform operator. This input signal may be for example, but not limited to, in a form of markers defining the start and end times of a commercial break. Those skilled in the art will appreciate that, in broadcast cable systems, these markers may be signaled in the transport stream as PTS (Presentation Time Stamps) values carried in SCTE-35 (Society of Cable and Telecommunications Engineers) sections. At step 330, a determination is made about whether the commercial break has elapsed or not. If it is determined that the commercial break has not elapsed and that there are more selected advertisements to be played (step 333), then said selected advertisements from step 320 continue to be played. It may happen that the estimate of the duration of the next commercial break is less than the actual commercial break duration thereby resulting in situations where the selected advertisements do not entirely fill the actual commercial break i.e. it is determined at step 333 that the commercial break has ended but no more selected advertisements are available to be played. In such a case, the advertisement system 230 returns to the first step 300 and estimates the duration of the next commercial break which is, in this situation, the remaining duration of the commercial break. Then, processes described hereinabove in relation to steps 310 and 320 are repeated.

If it is determined that the commercial break has elapsed, then the event that was currently being viewed prior to the advertisements is resumed at the expiration time received at step 360. In another embodiment of the present invention, it is possible to allow an advertisement to be played in its entirety even if the advertising system 230 is notified that the event has resumed. In this situation, a determination is made whether the missed portion of the event, i.e. the portion of the event between the expiration time and the end of the overlapping advertisement, is important or not (step 340). If it is determined that said portion is important and has to be played, then the corresponding content is typically stored in a storage device at step 350, that may be any type of storage. The size of the content stored in the storage device increases until the advertisement is played in its entirety. At this point, the content is played back from the storage device (step 360) and displayed on the display device 250 while the content corresponding to the live broadcast event keeps being stored in the storage device as it is well-known in the art for time shifting systems. Therefore, the content displayed on the display device from the storage device lags behind the live broadcast event. In an embodiment of the present invention, this lag may be taken into consideration when estimating an amount of time corresponding to the duration for the next or a future commercial break. In other words, the estimated duration for a next or future commercial break may be reduced in accordance with the duration of the lag thereby allowing a user to eventually catch-up with the live broadcast event. It will be appreciated by those skilled in the art that conventional techniques well-known in the art may be used to eventually catch-up with the live broadcast—especially at a time close to the end of the live broadcast event—including playing the content from the storage device at a faster than real time speed.

Finally, if it is determined that said portion is not important at step 340, then the portion is not stored nor played and the event currently being viewed starts being played at the end of the overlapping advertisement (step 360). In another embodiment of the present invention, in a case where the advertisement currently being played when the commercial break expires is not the last one from the selected advertisements, than the subsequent advertisements are dropped and the same procedure applies to the missed portion of the event currently being viewed as described in relation to steps 350 or 360.

In another embodiment of the present invention, the end time of the event currently being viewed is also taken into consideration for estimating the duration of the future commercial breaks and selecting the advertisements to be played thereby ensuring that the event will be finishing at its scheduled end time. The advertisement system 230 may not allow the live broadcast event currently being viewed to lag more than a predefined amount of time from the content played back from the storage device so that synchronization of the event with its scheduled end time may be enabled. To do so, the advertisement system 230 may make more conservative estimates for the duration of future commercial breaks especially when it gets close to the scheduled end time of the event. For example, a configurable guard time may be subtracted from the estimated duration of the commercial break. Additionally or alternatively, methods described hereinabove such as increasing the play rate when playing back the event from the storage device, dropping some advertisements or losing portions of the event considered as not important may be used. Those skilled in the art will appreciate that other techniques may be employed to enable this synchronization.

The method described hereinabove is repeated as long as the event is being viewed. When the event finishes or when the user is changing the service to view another event, then the same method may be applied to the newly viewed event.

Figure 4A:
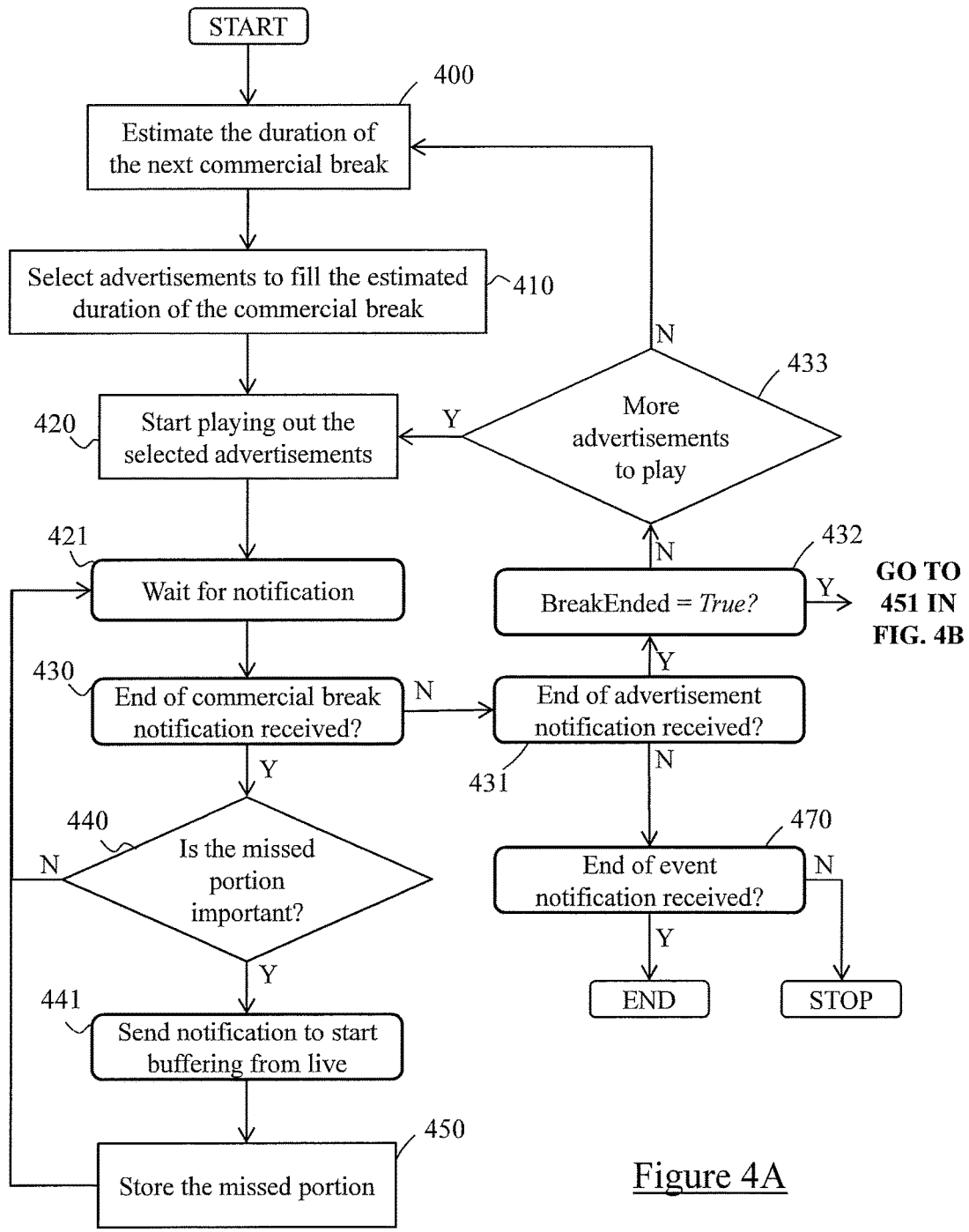
FIGS. 4A and 4B are flow charts of a method of estimating the duration of a commercial break and of selecting advertisements to fill said commercial break in accordance with another embodiment of the present invention.
Figure 4B:
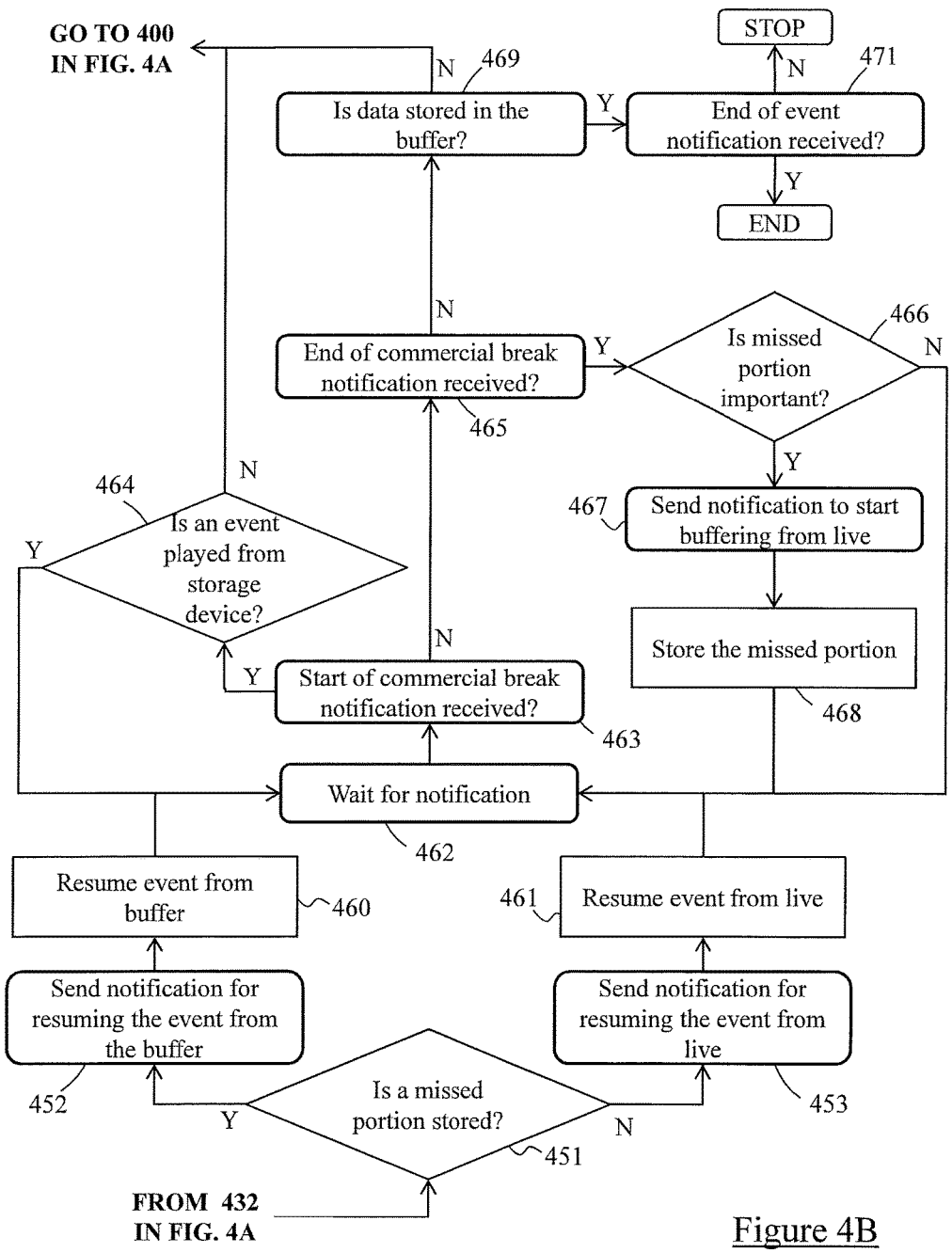

Reference is now made to FIGS. 4A and 4B, which are flow charts of a method of estimating the duration of a commercial break and of selecting advertisements to fill said commercial break in accordance with another embodiment of the present invention. The method illustrates the different notifications handled (received and sent) by the advertisement system 230 for performing the different steps described previously in relation to FIG. 3.

The process starts at step 400 of FIG. 4A where the advertisement system 230 estimates the duration of the next commercial break. Then, one or more advertisements are selected to be played out during said commercial break (step 410). At step 420, the advertisement system 230 starts playing out the selected advertisements.

At step 421, the advertising system 230 waits to receive a notification while playing out the advertisements selected at step 420. A notification may be an input sent by the service operator, the platform operator or generated by the advertisement system 230 itself that relates to an expiration time of a commercial break, an expiration time of an advertisement currently being played out, an expiration time of an event, a start time of a commercial break or even signaling whether or not data is stored in the storage device.

Once a first notification is received, the advertisement system 230 determines at step 430 if the notification is related to the expiration time of the commercial break. If it is determined that the notification signals the end of the commercial break, then the advertisement system 230 determines at step 440 if a missed portion of the event is important and therefore is to be stored (steps 441 and 450) in a storage device. The stored portion may be used later for playing back the event from the buffer when the advertisement currently being played out has been played out in its entirety. If it is determined at step 440 that a missed portion of the event is not important and therefore is not to be stored, then the advertisement system 230 continues to play out the selected advertisements and waits for receiving a further notification (step 421).

If it is determined that the notification received at step 430 is not related to the expiration time of the commercial break, then the advertisement system 230 determines at step 431 if the notification is related to the expiration time of the advertisement currently being played out. If the notification is not related to the expiration time of the advertisement currently being played out, the advertisement system 230 performs a further determination 470 to check if the notification is related to the expiration time of the event. The event may therefore be resumed and finished after completion of the playing out of the current advertisement. On the other hand, if it is determined at step 431 that the notification is related to the expiration time of the advertisement currently being played out, then the advertisement system 230 checks if a notification related to the expiration time of the commercial break has been previously received (step 432).

If it is determined that no notification related to the expiration time of the commercial break was previously received, a further determination is made by the advertisement system 230 at step 433 to check if more advertisements are available to be played out. If more advertisements are available to be played out, the advertisement system 230 plays out the next advertisement from the one or more selected advertisements (step 420). If it is determined that there are no more advertisements available to be played out, the advertisement system 230 estimates a new duration of the next commercial break which is, in this situation, the remaining duration of the commercial break (step 400) depending on the determination made at step 433.

Furthermore, and referring now to FIG. 4B, if it is determined at step 432 that a notification related to the expiration time of the commercial break has been received previously, then the advertisement system 230 checks if a missed portion of the event has been stored in the storage device at step 450 and may either perform one of the following actions depending on the result of step 451:

- if it is determined at step 451, that a missed portion is stored in the storage device, then the advertisement system 230 sends a notification for resuming the event from the storage device (step 452) and resumes the event from the storage device (step 460); or
- if it is determined at step 451, that no missed portion is stored in the storage device, then the advertisement system 230 sends a notification for resuming the event from the live broadcast (step 453) and resumes the event from the live broadcast (step 461).

In any case, the event is resumed (either from the storage device or from the live broadcast) and the advertisement system 230 waits to receive a further notification (step 462).

At step 463, a notification is received and the advertisement system 230 checks if said notification is related to a start time of a commercial break. If it is determined that the notification is related to a start time of a commercial break, a further determination is made at step 464 to determine whether the event has resumed from the storage device or from the live broadcast. If the event has resumed from the live broadcast, then the advertisement system 230 returns to initial step 400 for estimating a duration for the next commercial break, selecting one or more advertisements to fill said estimated duration of the commercial break (step 410) and starting playing out the selected advertisements (step 420), etc. If the event has resumed from the storage device, then the advertisement system 230 continues to play the event from the storage device thereby allowing a user to eventually catch-up with the live broadcast event. In parallel, the advertisement system 230 waits to receive a further notification (step 462).

If the notification received at step 463 is not related to the start time of a commercial break, the advertisement system 230 proceeds to a further determination to determine whether the received notification is related to an expiration time of a commercial break (step 465). In a situation where the notification is related to an expiration time of a commercial break (meaning that a previous notification signaling a start time of a commercial break has been received), the advertisement system 230 further determines if a missed portion is important and therefore is to be stored (steps 467 and 468) or not (similar to the determination made in step 340 on FIG. 4A.) The advertisement system 230 plays back the event from the storage device while waiting to receive a further notification. If it is determined at step 466 that a missed portion of the event is not important, then missed portion of the event is not stored, then the advertisement system 230 goes back to step 462 and waits for a further notification.

If the notification received after step 462 (i.e. at step 463 or step 465) is not related to a start time of a commercial break or to an expiration time of a commercial break, the advertisement system 230 determines if the notification signals that no data is stored in the storage device (step 469). This step is particularly useful to identify when the storage device is empty i.e. when the user has caught-up with the live broadcast event, so that the process then goes back to step 400 of FIG. 4A. If the notification received signals that data are stored in the storage device, then the advertisement system 230 further checks, at step 471, if the received notification is related to the expiration time of the event (similar to the determination made at step 470.) The event may therefore be resumed from the storage device and finished at the time when no more data is stored in the storage device.

Figure 5:
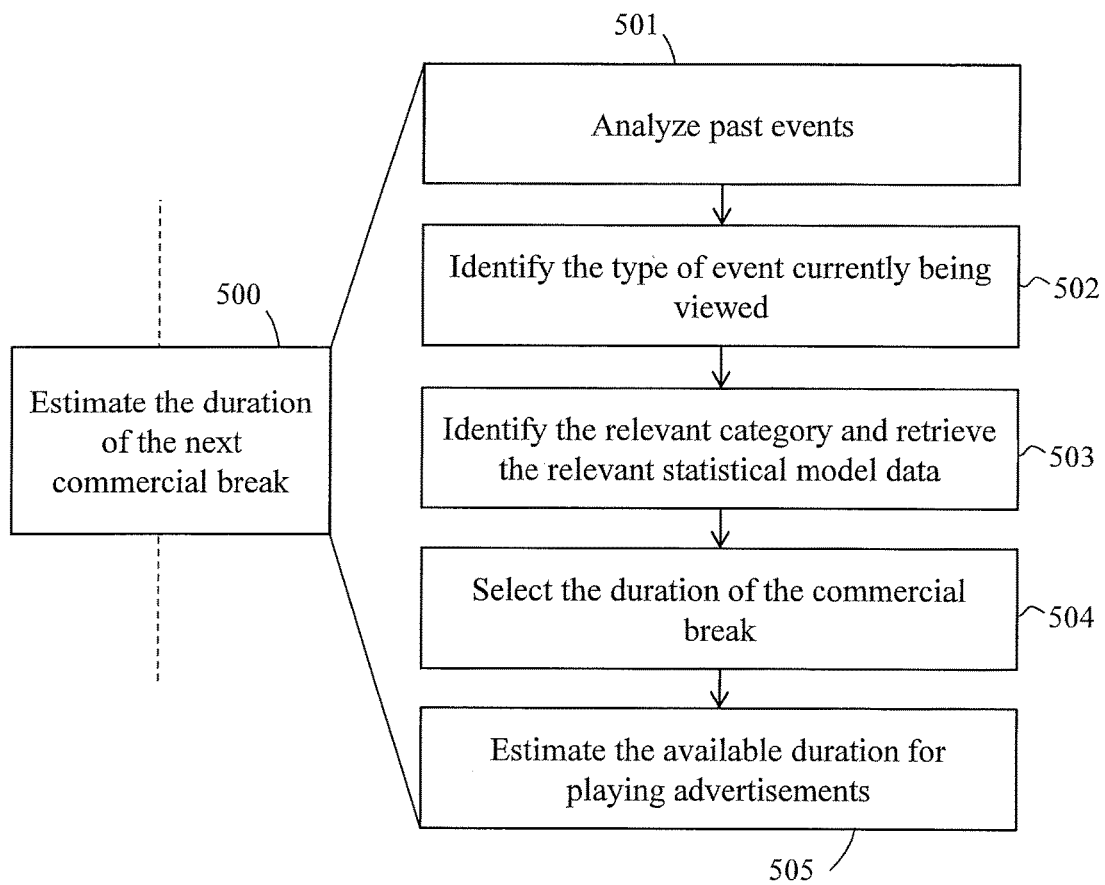
FIG. 5 is a flow chart of a method of estimating the duration of a commercial break in accordance with an embodiment of the present invention.

Reference is now made to FIG. 5, which is a flow chart of a method of estimating the duration of a commercial break in accordance with an embodiment of the present invention. The method provides estimation for the duration of the next commercial break based on the type of event currently being viewed. Additional constraints associated with the duration of the event itself such as the synchronization and the catching-up processes explained hereinabove in relation to FIG. 3 may also be taken into account in said estimation.

The process begins at initial step 501. The advertising system 230 analyzes past events broadcast over a sample period in order to populate a database (not shown in previous figures). Those skilled in the art will appreciate that the database may be in any suitable form, located in any suitable part of the content distribution system and that this analysis may be performed in advance or at run time. Statistical modeling and human input are typically used by the advertising system 230 to analyze the past events. For each past event, the analysis typically comprises retrieving a relevant set of parameters such as, but not limited to, durations of the commercial breaks in the event, total duration of the event and importance of the audio video content in the event.

Past events are then sorted and gathered into different event categories in the database. Typically, the past events having same or similar relevant sets of parameters are grouped into a single category. For example, it may be possible that two cricket matches having similar commercial breaks durations, total duration and importance of the audio video content are placed into a same category. Two movies having similar commercial breaks duration, total duration and importance of AV content may be placed in another category, etc.

Then, the advertising system 230 processes the relevant sets of parameters related to events of a same category to generate and output statistical modeling data that specifically characterizes the pattern and distribution of commercial breaks of a given category. This statistical modeling data includes an estimate of the duration of the commercial breaks that best fits the analyzed events, which may be used as a default estimate for a similar event being viewed. Furthermore, several additional estimates of the duration of the commercial breaks in the analyzed events may also be provided. Additionally, the advertisement system 230 is also able to collect relevant attributes of each analyzed event. The relevant attributes specifically characterize the type of the event and may include the event's name, genre and other associated metadata. For each category, the relevant attributes of the analyzed events in said category collected by the advertisement system 230 are stored along with the statistical modeling data.

Consequently, each category of the database is associated with:
  statistical modeling data modeling the pattern and distribution of the commercial breaks for the events of said category; and
  a collection of relevant attributes describing the type of events contained in said category.

An example of a past event to be analyzed may be a cricket match. A cricket match broadcast typically comprises different parts such as, for example, a presentation of the match, two periods of play called innings and a post-match analysis. Furthermore, the two innings typically comprise actual periods of play called overs. Commercial breaks are typically scheduled between overs but may also be triggered by some special actions occurring during the match. For example, each team may request a timeout thereby pausing the game for a certain duration. Another special action may be a batsman being 'given out' (also called a wicket). In such a situation, there is a pause in the game corresponding to the time taken for the next batsman to enter the field and be ready to play.

The first step of the analysis includes identifying the different parts of the cricket match, determining their durations and listing them as a sequence. Then, the results are extracted and sorted for each identified part of the cricket match.

The meanings of certain acronyms and abbreviations used herein are given in Table 1.

TABLE 1

| Acronyms and Abbreviations | |
|---|---|
| P | period of Play |
| B | commercial Break |
| BW | commercial Break triggered by a Wicket |
| BTO | commercial Break triggered by a TimeOut |
| BA | commercial Break during commentator's Analysis |
| A | Commentator analysis |

For a first cricket match, the identified parts with their durations may be listed as follows (the figures below are given in seconds):

For a first cricket match

First inning (first team batting): 240 (P), 40 (B), 209 (P), 42 (B), 45 (P), 48 (BW), 236 (P), 39 (B), 161 (P), 45 (B), 176 (P), 48 (B), 50 (P), 30 (BW), 120 (P), 46 (B), 177 (P), 39 (B), 189 (P), 149 (BTO), 166 (P), 38 (BW), 66 (P), 36 (B), 145 (P), 25 (BW), 139 (P), 40 (B), 142 (P), 36 (B), 125 (P), 30 (B), 140 (P), 30 (B), 116 (P), 35 (B), 159 (P), 152 (BTO), 146 (P), 50 (B), 50 (P), 35 (BW), 138 (P), 34 (B), 149 (P), 30 (BW), 68 (P), 35 (B), 122 (P) and 16 (BW).

Break between the two innings: 665 (A) and 131 (BA).

Second inning (second team batting): 378 (P), 48 (B), 222 (P), 45 (B), 203 (P), 47 (B), 143 (P), 40 (BW), 36 (P), 48 (B), 241 (P), 45 (B), 172 (P), 39 (BW), 178 (P), 45 (B), 147 (P), 47 (B), 219 (P), 149 (BTO), 191 (P), 38 (B), 138 (P), 40 (B), 146 (P) and 35 (B).

Post-match analysis: 1340 (A), 158 (BA), 190 (A) and 295 (BA).

Then, the results are extracted and sorted for each identified part:

Periods of play (P): 240, 209, 45, 236, 161, 176, 50, 120, 177, 189, 166, 66, 145, 139, 142, 125, 140, 116, 159, 146, 50, 138, 149, 68, 122, 378, 222, 203, 143, 36, 241, 172, 178, 147, 219, 191, 138 and 146.

Commercial breaks (B): 40, 42, 39, 45, 48, 46, 39, 36, 40, 36, 30, 30, 35, 50, 34, 35, 48, 45, 47, 48, 45, 45, 47, 38, 40 and 35.

Commercial breaks triggered by a wicket (BW): 48, 30, 38, 25, 35, 30, 16, 40 and 39.

Commercial breaks triggered by a timeout (BTO): 149, 152 and 149.

Commercial breaks during commentator's analysis (BA): 131, 158 and 295.

Commentator analysis (A): 665, 1340 and 190.

For a second cricket match, the identified parts and their durations may be listed as follows (the figures below are given in seconds):

For a second cricket match (for sake of clarity and conciseness, the list presented below is a sample of the complete list for the second cricket game and corresponds to one inning only)

48 (B), 256 (P), 80 (B), 267 (P), 45 (B), 220 (P), 70 (B), 223 (P), 86 (B), 269 (P), 80 (BW), 140 (P), 55 (B), 266 (P), 60 (B), 245 (P), 60 (B), 222 (P), 70 (B), 138 (P), 61 (BW), 64 (P), 49 (B), 270 (P), 46 (B), 197 (P), 50 (B), 218 (P), 45 (B), 228 (P), 53 (B) and 230 (P).

Additional data (not shown is the sample) corresponding to commercial breaks due to a wicket (BW) are also given: 89, 72 and 36.

Again, the results are extracted and sorted for each identified part:

Periods of play (P): 256, 267, 220, 223, 269, 140, 266, 245, 222, 138, 64, 270, 197, 218, 228 and 230.

Commercial breaks (B): 48, 80, 45, 70, 86, 55, 60, 60, 70, 49, 46, 50, 45 and 53.

Commercial breaks triggered by a wicket (BW): 80, 61, 89, 72 and 36.

From these two lists, the advertisement system 230 computes the relevant set of parameters—durations of the commercial breaks, total duration and importance of the AV content—for each cricket game. The importance of the AV content depends on the event. In a cricket match, the most interesting part is typically the actual period of play, i.e. when the bowler bowls the ball or when the batsman tries to hit the ball etc. Therefore, it may be determined by the advertisement system 230 that the AV content corresponding to these portions—periods of play—is important and should not be missed. On the contrary, there are other parts that are less interesting e.g. at the end of an over. Therefore, it may be determined that these portions are not important and may be missed. At this step, the advertising system 230 is able to determine that the two cricket games have same or similar relevant sets of parameters and therefore that they should be placed into a single category.

In a second step, the advertisement system 230 processes the relevant sets of parameters related to events of a given category to generate and output statistical modeling data that specifically characterizes patterns and distribution of commercial breaks of a given category. The durations of commercial breaks are extracted and gathered together prior to being sorted for each identified part of the cricket matches.

Commercial breaks durations of the two cricket matches:
Commercial breaks (B): 40, 42, 39, 45, 48, 46, 39, 36, 40, 36, 30, 30, 35, 50, 34, 35, 48, 45, 47, 48, 45, 45, 47, 38, 40, 35, 48, 80, 45, 70, 86, 55, 60, 60, 70, 49, 46, 50, 45 and 53.

Commercial breaks triggered by a wicket (BW): 48, 30, 38, 25, 35, 30, 16, 40, 39, 80, 61, 89, 72 and 36.

Commercial breaks triggered by a timeout (BTO): 149, 152 and 149.

Commercial breaks during commentator's analysis (BA): 131, 158 and 295.

By analyzing the data retrieved from this second step of the analysis, it is possible to identify some trends or patterns characterizing the commercial breaks in the events:

The commercial breaks triggered by timeouts usually occur during periods of play and their durations are approximately of 150 seconds. These commercial breaks are longer than the other types of commercial breaks occurring during the periods of play whose maximum duration is 89 seconds. Therefore, if the duration of a commercial break occurring during a period of play is more than approximately 95 seconds (adding a safe guard duration of 6 seconds to the maximum duration), it may be assumed that 150 seconds is a good estimate for the duration of the commercial break; and A long content slot (longer than 500 seconds) is usually followed by a long commercial break (longer than 130 seconds). This usually corresponds to commercial breaks scheduled during the commentator's analysis at the beginning, in the middle or at the end of the match.

However, no other obvious trends may be observed from the first two stages of analysis especially in relation to the other commercial breaks occurring during the periods of play (commercial breaks B and commercial breaks triggered by a wicket BW).

A third step of this analysis includes gathering and sorting the durations for the commercial breaks occurring during the periods of play (B and BW) in ascending order. Therefore, the following sequence is obtained at: 16, 25, 30, 30, 30, 30, 34, 35, 35, 35, 35, 36, 36, 36, 38, 38, 39, 39, 40, 40, 40, 40, 42, 45, 45, 45, 45, 45, 45, 46, 46, 47, 47, 48, 48, 48, 48, 49, 50, 50, 53, 55, 60, 60, 61, 70, 70, 72, 80, 80, 86 and 89.

Some simple calculations may be applied to this data sample to produce additional information characterizing the commercial breaks in the category. Therefore, it may be determined that, for example:

The mean (http://en.wikipedia.org/wiki/Mean) duration for these commercial breaks is approximately 47 seconds;

The median (http://en.wikipedia.org/wiki/Median) of this data sample is 45 seconds;

The mode (http://en.wikipedia.org/wiki/Mode_(statistics)) is 45 seconds; and

Most durations in this data sample are contained in a value range between 33 and 50 seconds.

Hence, one of these calculations may be selected as the best estimate for the duration of the commercial breaks of the analyzed events, which can then be used as the default or first estimate for a similar event being viewed. In any case, the value selected as the estimate may fulfill some criteria so that the estimate is accurate enough without adding too much complexity to the system. The following criteria may be taken into consideration when selecting the different estimates:

the selected value may be a good approximate for most of the data contained in the value range;

the selected value may try to minimize the error for the data at the extremes of the value range (minimum and maximum values);

the selected value may minimize as much as possible the number of further estimates necessary to generate the statistical model; and the selected value may allow playing out advertisements having a long duration.

For example, the advertisement system 230 may use the median value of 45 seconds as the best estimate. However, the actual duration of the commercial break for the event currently being viewed may be shorter. Therefore, the value of the duration of the commercial break has been overestimated, e.g. the duration of the commercial break has been overestimated by 29 seconds for an actual duration of a commercial break of 16 seconds for the event currently being viewed. In such a case, a signal will be received by the advertising system 230 notifying that the commercial break is about to elapse or has elapsed and that the live event currently being viewed has to be resumed as explained in relation to FIG. 3. The average advertisement duration being approximately 12 seconds, it will be realized that the event currently being viewed will lag from the live event by an average of 6 seconds. This average lag is acceptable for both the advertisement system 230 and the end user. Furthermore, the advertisement system 230 may catch-up with the live event by taking this delay into consideration when estimating the duration of the next commercial break. Those skilled in the art will also appreciate that using the median value of 45 seconds is an appropriate estimate for durations of commercial breaks contained in the value range between 33 and 50 seconds since it will enable the advertisement system 230 to play really long advertisements. In case of an overestimate, the event will lag from the live event as explained above before eventually catching-up. In case of an underestimate, new calculations are necessary since the advertisement system 230 has more time to play additional advertisements.

Therefore, a fourth step of the analysis includes removing the values less than or equal to the one selected as the best estimate of the duration of the commercial breaks of the analyzed events and processing the remaining values. Processing the remaining values includes subtracting the value of the best estimate and sorting the obtained values in ascending order.

Therefore, the following sequence is arrived at: 1, 1, 2, 2, 3, 3, 3, 3, 3, 4, 5, 5, 8, 10, 15, 15, 16, 25, 25, 27, 35, 35, 41 and 44. Again, some simple calculations may be applied to this data sample to produce additional information characterizing the commercial breaks in the category. Therefore, it may be determined that, for example, but without limiting the generality of the invention:

The mean value of this data sample is approximately 14 seconds;

The median of this data sample is either 5, 6.5 or 8 seconds. In a case where there is an even number of values in the data sample, there is no single middle value. The median is then usually defined to be the mean of the two middle values but any value comprised between the two middle values, or the two middle values, may be chosen as the median;

The mode is 3 seconds; and

Two distinct sets of data may be identified: a first set of data for values less than 10 seconds and a second set of data for values more than 10 seconds.

Hence, the advertising system 230 may select one of these calculations as a second estimate for the remaining duration of the commercial breaks of the analyzed events. Therefore, this second estimate may be used for a similar event being viewed in situations where the advertisement system 230 has determined that it has more time to play additional advertisements.

For example, the advertisement system 230 may select 5 seconds as the second estimate and remaining time available for playing additional advertisements. Once again, in case of underestimate, new calculations are necessary since the advertisement system 230 has more time to play additional advertisements. The fourth step of the analysis may be performed in an iterative manner for generating several further estimates. Consequently and given the second estimate of 5 seconds above, third, fourth, fifth and sixth estimations are provided below as examples, but without limiting the generality of the invention.

Third Estimate

Data sample: 3, 5, 10, 10, 11, 20, 20, 22, 30, 30, 36 and 39.

Mean value: approximately 20 seconds;
Median value: 20 seconds;
Mode: 10 seconds; and
The selected value as the third estimate may be 20 seconds.

Fourth Estimate

Data sample: 2, 10, 10, 16 and 19.
Mean value: approximately 11.5 seconds;
Median value: 10 seconds;
Mode: 10 seconds; and
The selected value as the fourth estimate may be 10 seconds.

Fifth Estimate

Data sample: 6 and 9.
Mean value: approximately 7.5 seconds; and
The selected value as the fifth estimate may be 9 seconds.

It will be remembered that the durations of the commercial breaks triggered by timeouts BTO were largely longer than the other commercial breaks occurring during the periods of play (B and BW) and were not processed as part of the data sample. It was determined that if the duration of a commercial break occurring during a period of play was more than approximately 95 seconds (adding a safe guard duration of 6 seconds to the maximum duration of commercial breaks B and BW), 150 seconds was a good estimate for the duration of the commercial break. In another embodiment of the present invention, these commercial breaks BTO may be included in the data sample and processed as such. However, those skilled in the art will appreciate that this may lead to less accurate estimates for the commercial breaks. In a further embodiment of the present invention, a sixth and/or final estimate may be generated for these commercial breaks triggered by timeouts BTO by processing the corresponding values. Those skilled in the art will appreciate that processing these values includes subtracting the values of all previous estimates and sorting the obtained values in ascending order.

It will also be remembered that the data sample corresponding to the commercial breaks triggered by a timeout (BTO) is as follows: 149, 152 and 149. Therefore, by processing the data sample i.e. subtracting the sum of the previous estimates (first estimate of 45 seconds; second estimate of 5 seconds; third estimate of 20 seconds; fourth estimate of 10 seconds; and fifth estimate of 9 seconds leading to a total amount of 89 seconds resulting from the addition of the different estimates selected in the previous non-limiting examples) and sorting the values, the following sequence is obtained: 60, 60 and 62.

Again, some simple calculations may be applied to this data sample to produce additional information characterizing the commercial breaks triggered by timeouts in the events. Therefore, it may be calculated that:

The mean value of this data sample is approximately 60.5 seconds;
The median of this data sample is 60 seconds;
The mode is 60 seconds; and
The selected value may be 60 seconds.

Those skilled in the art will appreciate that similar analyses may be performed on the other parts of the events. The example given above described the pattern of commercial breaks during the periods of play of the match (play state). However, similar calculations may be performed and estimates obtained for the commercial breaks occurring during the commentator's presentation or post-match conclusion (non-play state). Furthermore, refined information may be obtained for the transition between the play and non-play states. Additional data corresponding to commentator analysis (A) and commercial breaks occurring during commentator analysis (BA) are given below:

Before the match:
Sample 1: 805 (A), 230 (BA), 602 (A), 125 (BA), 598 (A), 319 (BA), 445 (A) and 235 (BA).
Sample 2: 698 (A), 238 (BA), 462 (A), 234 (BA), 620 (A), 245 (BA), 497 (A) and 232 (BA).
Before the first inning.
Sample 1: 593 (A).
Sample 2: 410 (A).
Between the two innings:
Sample 1: 720 (A), 120 (BA) and 578 (A).
Sample 2: 849 (A), 150 (BA) and 255 (A).
Sample 3: 665 (A), 131 (BA) and 378 (A).
After the match:
Sample 1: 1505 (A), 211 (BA), 462 (A), 232 (BA) and 240 (A).
Sample 2: 1110 (A), 241 (BA), 302 (A), 221 (BA) and 290 (A).
Sample 3: 1340 (A) and 158 (BA).
Again, the results corresponding to the commercial breaks BA are extracted and sorted:

Commercial breaks BA: 120, 125, 131, 150, 158, 211, 230, 232, 232, 234, 235, 238, 245 and 319.

Those skilled in the art will appreciate that some simple calculations similar to the calculations described hereinabove may be performed on these data, thereby resulting to a plurality of estimates for commercial breaks BA:

first estimate: the selected value may be 120 seconds;
second estimate: the selected value may be 11 seconds;
third estimate: the selected value may be 20 seconds;
fourth estimate: the selected value may be 60 seconds;
fifth estimate: the selected value may be 20 seconds; and
sixth estimate: the selected value may be 10 seconds.

At the end of this analysis, the statistical model data that specifically characterizes the commercial breaks of a given category is generated. In the example described above, the following statistical model may be arrived at:

(a) For the play state, use:
45 seconds as the best estimate for the commercial breaks duration;
10 seconds as the second estimate;
20 seconds as the third estimate;
10 seconds as the fourth estimate;
9 seconds as the fifth estimate;
60 seconds for the sixth estimate; and
10 seconds as a random estimate that is to be used repeatedly after the sixth estimation as needed.

(b) For the non-play state, use:
120 seconds as the best estimate for the commercial breaks duration;
11 seconds as the second estimate;
20 seconds as the third estimate;
60 seconds as the fourth estimate;
20 seconds as the fifth estimate;
10 seconds for the sixth estimate; and
10 seconds as a random estimate that is to be used repeatedly afterwards as needed.

(c) Transition between play and non-play states:
Use the estimate(s) corresponding to the non-play state as the default or first estimate for the duration of commercial breaks when an event starts on a current service;
Use the estimate(s) corresponding to the play state as the default or first estimate for the duration of commercial breaks when a new event on a different service is selected;
Use the non-play state estimate(s) after detecting a particular sequence. This particular sequence may be as follows: long content slot having a duration more than 300 seconds followed by a commercial break having a duration more than 200 seconds; and
Use the play state estimate(s) after detecting a particular sequence. This particular sequence may be as follows: commercial break having a duration less than 100 seconds followed by a content slot having a duration less than 300 seconds.

Those skilled in the art will appreciate that the statistical model data generated by the advertising system may be in any appropriate form as long as they can be stored in the database and later be transmitted and interpreted by the advertisement system 230 as per needed.

At step 502, the advertising system 230 identifies the type of the event currently being viewed. Those skilled in the art will appreciate that any attribute of the event currently being viewed, such as genre or subgenre information, as well as other metadata may be used to identify the event type. This identification is typically made at run time i.e. when the event is broadcast and at a time when the user starts viewing the event. In another embodiment of the present invention, the events scheduled to be broadcast are pre-processed so that the information regarding the type of event is already available prior to the user viewing the event. In a further embodiment of the present invention, the attributes of the event may be combined to identify the type of event currently being viewed.

In a third step (step 503), a request is sent to the database created at step 501. The advertising system 230 compares the type of event identified in the previous step with the collections of relevant attributes describing the type of events contained in the different categories of the database. Once the relevant category is identified, the advertising system 230 retrieves the relevant statistical model data.

At step 504, one estimate from the plurality of estimates present in the statistical model data is selected and used as the estimated duration of the next commercial break.

Finally, an estimate of the available duration for the next commercial break is made at step 505 by possibly reducing the estimated duration for the next commercial break. This reduction is particularly useful in situations where the advertising system 230 needs to decrease or even eliminate the lag between the delayed version of the event played back from the storage device and the live broadcast event. It typically comprises reducing the estimated duration for the commercial break duration retrieved from the statistical model by a certain amount of time corresponding to the lag duration. If this adjustment is not needed because there is no need to reduce and/or eliminate the lag or if there is no lag, then the estimated duration of the next commercial break received from step 504 corresponds to the duration available for playing the advertisements.

The process ends at step 505 and the estimate is used in step 310 of FIG. 3 during the advertisements selection process.

Figure 6:
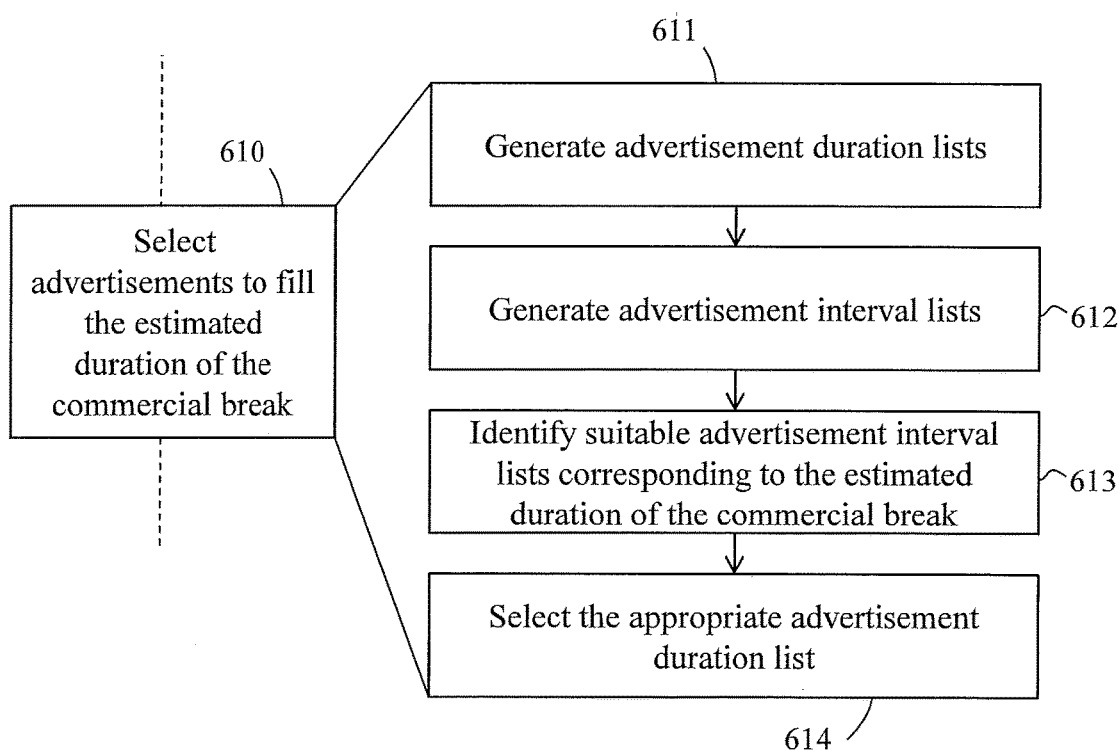
FIG. 6 is a flow chart of a method of selecting advertisements to fill an estimated duration of a commercial break in accordance with an embodiment of the present invention.

Reference is now made to FIG. 6, which is a flow chart of a method of selecting the advertisements to fill an estimated duration of a commercial break in accordance with an embodiment of the present invention. The method enables the advertisement system 230 to select at least one advertisement to be played during the commercial break.

The process starts at step 611. The advertisement system 230 is able to determine the duration of each available advertisement. Then, the advertisements are sorted into different groups according to their determined durations thereby forming a plurality of advertisement duration lists. An advertisement duration list typically comprises advertisements having the same determined duration. In another embodiment of the present invention, an advertisement duration list comprises advertisements having similar determined durations. Table 2 shows a non-limiting example of advertisement duration lists generated by the advertisement system 230:

TABLE 2

| Adv. duration (second(s)) | Advertisement duration lists | | | | |
|---|---|---|---|---|---|
| 1 | ∅ | ∅ | ∅ | ... | ∅ |
| 2 | Ad 2.1 | Ad 2.2 | Ad 2.3 | ... | Ad 2.i |
| 3 | Ad 3.1 | Ad 3.2 | ∅ | ... | ∅ |
| ... | ... | ... | ... | ... | ... |
| n | Ad n.1 | Ad n.2 | Ad 2.3 | ... | Ad n.i |

In this example, an advertisement duration list, corresponding to a duration of 2 seconds, lists all the available advertisements having a duration of 2 seconds. The corresponding entry in table 2 shows that a plurality of advertisements having a duration of 2 seconds are available: Ad 2.1, Ad 2.2, Ad 2.3 to Ad 2.i. The next entry of table 2 shows that only two advertisements of 3 seconds are available: Ad 3.1 and Ad 3.2. It will be appreciated by those skilled in the art that the advertisements made available to the advertisement system 230 may be provided by third parties i.e. advertisers. The advertisements may be stored in any suitable location of the content distribution system such as the headend, the advertisement system 230 or even the client device 240. The generated advertisement duration lists typically comprise a list of pointers, wherein each pointer enables the advertisement system 230 to locate and retrieve the corresponding advertisement at the time when the corresponding advertisement is to be played. In another embodiment, the advertisement duration lists may be generated by rearranging the advertisements in the storage device, wherever the advertisements are stored, and therefore may comprise the advertisements themselves. In a further embodiment of the present invention, the advertisements in the generated advertisement duration lists are ordered so that the most appropriate advertisements may be accessed and played in priority. Ordering the advertisements in the advertisement duration lists includes for instance, but without limiting the generality of the invention, applying a rule for placing the advertisements generating most revenue at the beginning of the advertisement duration lists, applying contextual criteria for placing the advertisements most relevant to the event currently being viewed at the beginning of the advertisement duration lists, or using user preferences for placing the advertisements most relevant to the user at the beginning of the advertisement duration lists, etc. Those skilled in the art will appreciate that any suitable method may be used for ordering the advertisements in the advertisement duration lists.

At step 612, the advertising system 230 generates advertisement interval lists by determining which advertisement durations—obtained from previous step 611—may be available and combined to fill a particular duration. Table 3 shows several non-limiting examples of advertisement interval lists generated for durations comprised in a value range of 5 to 8 seconds. However, those skilled in the art will appreciate that an advertisement interval list, combining a single or a plurality of advertisement duration lists, may be generated for any duration:

seconds: generate an advertisement interval list {6} comprising a single advertisement; generate and advertisement interval list {4+2} or {(3+3)} comprising a combination of advertisement durations.

Furthermore, in an embodiment of the present invention, the advertisement durations of an advertisement interval list may be ordered according to the advertisements' duration. In other words, the advertisements having the longest duration may be placed in first position of the advertisement interval list. The advantage of such a mechanism is that it enables the advertising system 230 to play the longest advertisement at the beginning of the commercial break and to ease the synchronization process when the event currently being viewed gets close to its end time.

Then, the advertising system 230 uses the value of the estimated duration for the next commercial break at step 613 to identify suitable advertisement interval lists. In a case where no advertisement interval lists are identified because it was not possible to generate advertisement interval lists for the estimated duration of the next commercial break, then the advertising system 230 typically chooses the advertisement interval list having a value closest to but not less than the estimated duration of the commercial break. In another embodiment of the present invention, the advertising system 230 may choose the advertisement interval list having a value closest to but more than the estimated duration of the commercial break in cases where it is determined that the event is not getting close to its end time so that the advertisement system 230 is able to catch-up later with the live broadcast event.

At step 614, the advertising system 230 selects the appropriate advertisement interval list among the suitable advertisement interval lists identified at step 613. The appropriate advertisement interval list may be for example, but not limited to, the one comprising the advertisement of the longest duration. In another embodiment of the present invention, when the event gets close to its end time, the appropriate advertisement interval list may be the last the one comprising advertisements of shortest durations thereby easing the catching-up and synchronization processes if necessary. Once selected, the appropriate advertisement interval list is accessed and the advertisement duration list(s) corresponding to the advertisement duration(s) present in the appropriate advertisement interval list is(are) identified. The client device 240 accesses the first advertisement duration

TABLE 3

| duration (second(s)) | Advertisement interval lists | | | | | | |
|---|---|---|---|---|---|---|---|
| 5 | {5} | {3 + 2} | ∅ | ∅ | ∅ | ∅ | ∅ |
| 6 | {6} | {4 + 2} | {(3 + 3)} | ∅ | ∅ | ∅ | ∅ |
| 7 | {7} | {5 + 2} | {4 + 3} | {3 + (2 + 2)} | ∅ | ∅ | ∅ |
| 8 | {8} | {6 + 2} | {5 + 3} | {(4 + 4)} | {4 + (2 + 2)} | {(3 + 3) + 2} | {(2 + 2 + 2 + 2)} |

The first line of table 3 corresponds to a duration of 5 seconds. The advertisement system 230 has determined that no advertisements of 1 second were available (according to the example described in the previous step 611). Therefore, it will be appreciated that there are two ways to achieve a duration of 5 seconds: generate an advertisement interval list {5} with a single advertisement having a duration of 5 seconds; or generate an advertisement duration list {3+2} which combines two advertisements—one advertisement having a duration of 3 seconds and one advertisement having a duration of 2 seconds. It will be apparent from table 3 that there are three ways to achieve a duration of 6 list and typically plays the first entry of said advertisement duration list. Then, the subsequent advertisement duration lists are accessed one after another for retrieving and playing their first entries. For example, the advertisement system 230 may use an estimated duration of a next commercial break of 6 seconds to identify the suitable advertisement interval lists {6}, {4+2} and {(3+3)}. Then, the advertisement system 230 may determine that the advertisement interval list {4+2} is the appropriate advertisement interval list to be used. Therefore, the first advertisement duration list (comprising advertisements having a duration of 4 seconds) is identified and the first advertisement in that first list is played. Then, the second advertisement duration list (comprising advertisements having a duration of 2 seconds) is identified and the first advertisement of that second list is played. In a case where an advertisement duration list is accessed several times, then the advertisements of said advertisement duration list are played one after another. In other words, if it is determined that the first entry has already been played, then the second entry is played instead. This is the case when, for example, the advertisement system 230 determines that the appropriate advertisement interval list is the advertisement interval list {(3+3)}, the advertisement duration list comprising advertisements having a duration of 3 seconds is identified and the first advertisement is played. Then, the second advertisement of that same list is played. In another embodiment of the present invention, an advertisement is removed from the corresponding advertisement duration list once it has been played and/or the subsequent advertisement is placed in first position. Hence, if the same advertisement duration list is accessed again, then the new first entry can be played. Additionally or alternatively, if the removing operation causes the corresponding advertisement duration list to be empty, then the advertisement interval lists are updated accordingly and a new appropriate advertisement duration list is selected and accessed. In a further embodiment of the present invention, the number of advertisements present in an advertisement duration list is also taken into consideration at the time when the advertisement interval lists are generated thereby avoiding situations in which an advertisement duration list is empty. In another embodiment of the present invention, once played the advertisements are placed at the end of the advertisement duration list in a circular fashion.

Advertisement duration lists and advertisement interval lists are typically generated at a time when the event starts being viewed. In a further embodiment of the present invention, these lists are generated as soon as the advertisements are available and/or as soon as the database where the advertisements are stored is accessible. In another embodiment of the present invention, new available advertisements may also be added into these lists at run time if necessary.

Although the above embodiments have been described in the context of DVB implementation, someone skilled in the art will realize that other implementations are possible.

Although the above embodiments refer to live events for which commercial break durations were unknown, someone in the art will appreciate that the advertisements selecting system and methods may be applied to other systems including, but not limited to, advertisement substitution and/or advertisement insertion systems.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather the scope of the invention is defined by the appended claims and equivalents thereof.

What is claimed is:

1. A client device comprising:
   means for receiving a user input requesting a live event to be displayed;
   means for playing out said requested live event;
   means for identifying a type of said requested live event;
   means for estimating a duration of a next commercial break occurring in said requested live event according to an action or occurrence occurring in said requested live event and associated with said type;
   means for selecting an advertisement list having a duration corresponding to said estimated duration of said next commercial break, wherein said advertisement list comprises at least one advertisement; and
   wherein said means for playing out are further operative to play out said at least one advertisement from said advertisement list in said next commercial break following said action or occurrence.

2. The client device of claim 1, wherein said means for identifying a type of said requested live event is operative to use one or more of:
   genre information;
   subgenre information; and
   metadata information of said requested live event to identify said type of said requested event.

3. The client device of claim 1, wherein said means for estimating are further operative to:
   retrieve a set of parameters for each past event of a plurality of past live events;
   categorize said past live events according to said set of parameters, wherein said past live events having similar sets of parameters are grouped into a same category;
   generate, for each category, a plurality of estimates that specifically characterize commercial break durations of said past live events grouped into a same category;
   identify a category relevant to said identified type of said requested live event; and
   select an estimate from said plurality of estimates related to said identified relevant category.

4. The client device of claim 3, wherein said set of parameters comprises:
   commercial break durations for each of said past live events;
   a total duration for each of said past live events; and
   an importance of an audio video content item for each of said past live events.

5. The client device of claim 3, wherein said means for estimating are further operative to categorize said past live events by grouping said past live events having same sets of parameters into a same category.

6. The client device of claim 3, wherein said means for estimating are further operative to identify a category using one or more of:
   genre information;
   subgenre information; and
   metadata information of each of said past live events grouped in a same category to identify said type of said category.

7. The client device of claim 3, wherein said generating comprises generating, for each category, an estimate that best models commercial break durations of said past live events grouped into said same category.

8. The client device of claim 3, wherein said means for estimating are further operative to use said sets of parameters of said live past events grouped into a same category to generate said plurality of estimates.

9. The client device of claim 3, wherein said means for estimating are further operative to compare said type of said requested live event to said types of said categories to identify a category relevant to said requested live event.

10. The client device of claim 3, said means for estimating further operative to:

estimate a duration of a next commercial break using said selected estimate.

11. The client device of claim 10, wherein said means for estimating are further operative to reduce said selected estimate by a configurable guard time.

12. The client device of claim 1, wherein said means for selecting an advertisement list are further operative to:
   determine durations of a plurality of advertisements available to be played out;
   generate a plurality of available advertisement lists using said determined durations of said plurality of advertisements, wherein each of said plurality of available advertisement has a duration corresponding to said estimated duration of said next commercial break; and
   select said advertisement list from among said plurality of available advertisement lists to be played out.

13. The client device of claim 12, wherein said means for selecting an advertisement list are further operative to:
   group advertisements having a similar determined duration into a same group, thereby forming a plurality of advertisement duration lists; and
   sort each advertisement duration list of said plurality of advertisement duration lists.

14. The client device of claim 13, wherein said means for selecting an advertisement list are further operative to group advertisements having a same determined duration into a same group to form said plurality of advertisement duration lists.

15. The client device of claim 13, wherein said means for selecting an advertisement list are further operative to place advertisements generating most revenue to at least one of a service provider or a platform operator at the beginning of said each advertisement duration list of said plurality of advertisement duration lists.

16. The client device of claim 13, wherein said means for selecting an advertisement list are further operative to place advertisements most relevant to said requested event at the beginning of said each advertisement duration list of said plurality of advertisement duration lists.

17. The client device of claim 13, wherein said means for selecting an advertisement list are further operative to place advertisements most relevant to user preferences at the beginning of said each advertisement duration list of said plurality of advertisement duration lists.

18. The client device of claim 12, wherein said advertisement list selected from among said plurality of available advertisement lists has a duration that is less than said estimated duration for said next commercial break.

19. The client device of claim 12, wherein said advertisement list selected from among said plurality of available advertisement lists has a duration that is more than said estimated duration for said next commercial break.

20. The client device of claim 3 and further comprising:
   means for receiving an expiration time of said commercial break;
   means for determining an end time for said estimated duration of said commercial break; and
   means for resuming playing out said requested live event at said expiration time when said expiration time corresponds to said end time.

21. The client device of claim 3 and further comprising:
   means for receiving an expiration time of said commercial break;
   means for determining an end time for said estimated duration of said commercial break; and
   means for resuming playing out said requested live event at said end time when said expiration time is earlier than said end time.

22. The client device of claim 21, wherein said means for resuming playing out said requested live event at said determined end time further comprises:
   means for allowing an advertisement being played out after said expiration time to be played out in its entirety;
   means for storing a portion of said requested event in a storage device, wherein said storing starts at said expiration time;
   means for determining if said stored portion is important; and
   means for resuming playing out said requested live event at said determined end time by playing out said requested live event if it is determined that said stored portion is not important; or by playing back said stored portion of said requested event if it is determined that said stored portion is important.

23. The client device of claim 22, wherein said means for resuming said requested event at said determined end time by playing back said stored portion are operative to play back said stored portion of said requested event at a faster than real time speed.

24. The client device of claim 22 and further comprising:
   means for reducing an estimated duration of a further commercial break by an amount of time between said expiration time and said determined end time.

25. The client device of claim 20, wherein said resuming is made at said received expiration time when said expiration time is later than said determined end time.

26. The client device of claim 25 and further comprising:
   means for estimating a remaining duration of said commercial break occurring in said requested live event according to said type;
   means for selecting at least one further advertisement list having a duration corresponding to said estimated remaining duration of said commercial break; and
   means for playing out at least one advertisement from said at least one further advertisement list.

27. The client device of claim 26, wherein said means for estimating a remaining duration are operative to select one further estimate from said plurality of estimates.

28. The method according to claim 1 and wherein said means for estimating a duration are operative to vary said duration according to a specific said action or occurrence.

* * * * *